United States Patent [19]

Kreitzer

[11] Patent Number: 5,309,283
[45] Date of Patent: May 3, 1994

[54] HYBRID, COLOR-CORRECTED, PROJECTION TV LENS SYSTEM

[75] Inventor: Melvyn H. Kreitzer, Cincinnati, Ohio

[73] Assignee: U.S. Precision Lens Incorporated, Cincinnati, Ohio

[21] Appl. No.: 40,109

[22] Filed: Mar. 30, 1993

[51] Int. Cl.[5] .................. G02B 3/00; H04N 9/31; H04N 9/16

[52] U.S. Cl. ...................... 359/649; 359/648; 348/781

[58] Field of Search ............... 358/60, 64, 231, 237; 359/648, 649, 757, 713; G02B 3/00; H04N 9/31, 9/16, 9/18

[56] References Cited

U.S. PATENT DOCUMENTS

| | | | |
|---|---|---|---|
| 4,989,961 | 2/1991 | Yoshioka | 359/649 |
| 5,015,076 | 5/1991 | Ueda | 359/649 |
| 5,066,113 | 11/1991 | Nakajima et al. | 359/649 |

*Primary Examiner*—James J. Groody
*Assistant Examiner*—Glenton B. Burgess
*Attorney, Agent, or Firm*—Maurice M. Klee

[57] ABSTRACT

A projection lens system for projecting an image from a cathode ray tube (CRT) onto a screen is provided which includes in order from the image end: a first lens unit (U1), a second positive lens unit (U2) which may include a color correcting doublet, a corrector lens unit (CR), and a third negative lens unit (U3) which is associated with the CRT during use. The first lens unit preferably has a hybrid construction and includes: a first lens element (L1) composed of glass and having spherical surfaces, a second lens element (L2) composed of plastic and having at least one aspherical surface, and a third lens element (L3) also composed of plastic and having at least one aspherical surface. L1 has substantially more optical power than either L2 or L3, e.g., $|f_{L2}|/f_{L1}$ and $|f_{L3}|/f_{L1}$ are each above 1.3. In this way, the lens system is easily fabricated and is relatively insensitive to changes in temperature of the lens elements. The lens system is applicable to both rear and front projection televisions.

28 Claims, 5 Drawing Sheets

HYBRID, COLOR-CORRECTED, PROJECTION TV LENS SYSTEM

BACKGROUND OF THE INVENTION

1. Field of the Invention

This invention relates to projection lens systems for use in projection televisions and, in particular, to color-corrected projection lens systems which employ both glass and plastic lens elements, i.e., lens systems of the hybrid type.

2. Description of the Prior Art

Projection lens systems for CRT projection televisions have undergone continuing development during the past fifteen years or so. As a result, many of today's CRT projection televisions are equipped with fast lens systems which provide wide semi-fields of view.

When the field of view does not exceed a half-angle of about 25°, the lens system may consist of just three components and still provide a sufficiently high level of image quality. A typical configuration has a weak aspherical element on the image side of the lens system, followed by a strong positive power element, followed in turn by a strong negative element in close proximity to the CRT. See, for example, Betensky, U.S. Pat. Nos. 4,300,817, 4,348,081, and 4,526,442.

For this configuration, the aspherical first element provides correction primarily for aperture dependent aberrations including spherical aberration, the positive element provides most of the optical power of the system, the relative position of the aperture stop provides correction for astigmatism and lateral color, and the negative element close to the CRT provides correction for field dependent aberrations including the field curvature of the lens.

More generally, lens systems of this type can include more than three elements with the elements being arranged in three lens units, i.e., a "first" or "A" lens unit located on the image side of the lens system of weak power, a "second" or "B" lens unit following the first lens unit of strong positive power, and a "third" or "C" lens unit following the second lens unit of strong negative power.

When the focal length of the lens system is shortened to make the projection television more compact in the case of rear projection televisions or to make the magnification larger in the case of front projection televisions, the field coverage of the lens system must be increased. When the half-angle of view is increased to about 28°, a three element form generally cannot provide an appropriately high level of optical performance.

To address this problem, a fourth element or more generally a fourth unit (hereinafter referred to as the "corrector" or "CR" unit) has been added between the strong positive and the strong negative units of the three unit configuration, i.e., between the B and C units. See Betensky, U.S. Pat. No. 4,697,892, and Moskovich, U.S. Pat. Nos. 4,682,862, 4,755,028, and 4,776,681. This additional unit usually does not have much optical power; however, it must have an aspherical surface to correct for aperture dependent off-axis aberrations like sagittal oblique spherical and coma.

Color images for projection televisions are normally obtained by combining images from three color CRTs, i.e., a red CRT, a green CRT, and a blue CRT. The phosphors used in commercially available CRTs do not emit light at a single wavelength. In particular, green phosphors have significant sidebands in blue an red. Similar polychromaticity exists for red and blue phosphors, but to a lesser extent.

For many consumer applications, lens systems uncorrected for color can be used, notwithstanding the color spread of the CRTs. For more demanding applications, however, such as high definition television, data displays, or systems which operate at a high magnification, color correction is needed to avoid visible color fringing and/or a loss of image contrast.

A color-corrected projection lens is disclosed in Kreitzer, U.S. Pat. No. 4,900,139. This lens system employs the A, B, C, and CR units discussed above and achieves longitudinal color correction by means of, inter alia, a color-correcting doublet which is included in the B unit. Although lens systems constructed in accordance with this patent have worked well in practice, these systems can be susceptible to focus shifts with changes in temperature as a result of the use of plastic lens elements having not insignificant optical powers in the A unit. Also, the A unit plastic elements have had relatively non-uniform thicknesses making them relatively difficult to fabricate using injection molding techniques. Moreover, strong aspherical plastic elements in the A unit have high tolerance sensitivity.

The use of a plastic element having a relatively constant thickness to form a CR unit is discussed in the Moskovich '862 patent referred to above (see column 13, line 67, to column 14, line 28). The lens systems described in the examples of this patent are not color corrected. Also, the A units of those examples employ plastic elements having not insignificant optical powers, i.e., the A units may be subject to relatively large changes in their power as a result of changes in temperature.

SUMMARY OF THE INVENTION

In view of the foregoing state of the art, it is an object of the present invention to provide improved projection lens systems for use in projection televisions. More particularly, it is an object of the invention to provide projection lens systems of the hybrid type wherein the plastic lens elements of the system have low optical power and relatively uniform thicknesses.

To achieve these and other objects, the invention in accordance with certain of its aspects provides a projection lens system for use with a cathode ray tube comprising in order from the system's image side:

a first lens unit comprising a first lens element having spherical surfaces, a second lens element having at least one aspherical surface, and a third lens element having at least one aspherical surface, the second and third lens elements each having a focal length whose magnitude (absolute value) is greater than the focal length of the first lens element;

a second lens unit for supplying the majority of the lens system's positive optical power;

a corrector lens unit having at least one aspherical surface; and a third lens unit which is associated with the cathode ray tube during use of the lens system and which provides most of the correction for the field curvature of the lens system, said third lens unit having a negative optical power.

In accordance with certain preferred embodiments of the invention, the first lens element is made of glass and the second and third lens elements are made of plastic. In accordance with other preferred embodiments, the second and third lens elements each have a relatively constant thickness in order to facilitate their fabrication. In further preferred embodiments, the second lens unit includes a color correcting doublet for correcting the system's longitudinal color aberration.

In accordance with others of its aspects, the invention provides a projection lens system for use with a cathode ray tube comprising in order from the a first lens unit comprising a glass lens element and two plastic lens elements;

a second lens unit for supplying the majority of the lens system's positive optical power;

a corrector lens unit comprising at least one plastic lens element; and a third lens unit which is associated with the cathode ray tube during use of the lens system and which provides most of the correction for the field curvature of the lens system, said third lens unit having a negative optical power.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

Figure 1:
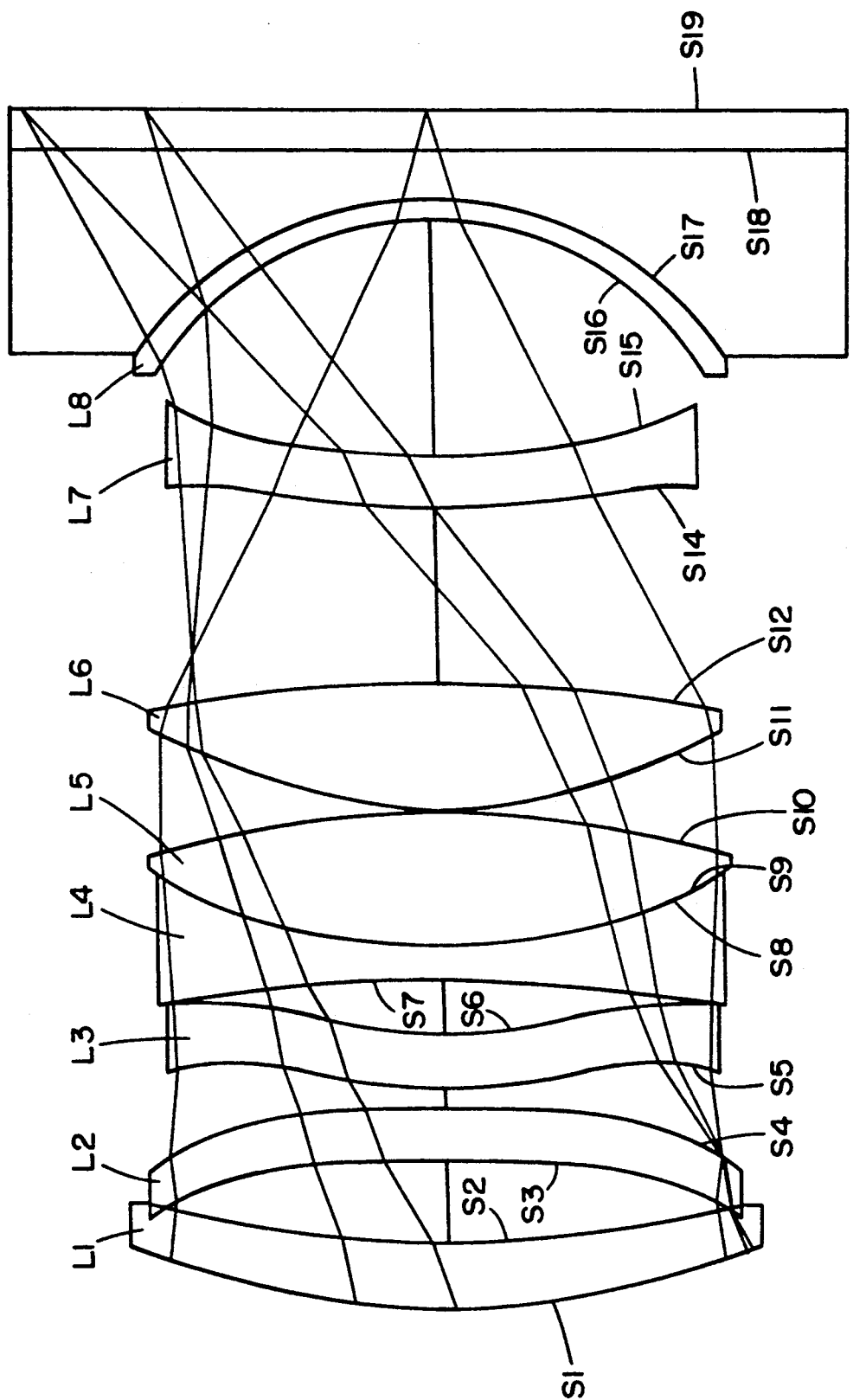
FIGS. 1 through 4 are schematic side views of lens systems constructed in accordance with the invention.

As discussed above, the lens systems of the present invention include A, B, CR, and C units wherein the A unit includes three lens elements (L1, L2, and L3), one of which has spherical surfaces (e g., L1 in FIGS. 1-4) and the other two of which have at least one aspherical surface (e.g., L2 and L3 in FIGS. 1-4).

The A unit serves to correct aperture type aberrations including spherical aberration and coma. As can be seen from the ray tracings of FIGS. 1-4, this unit operates on substantially the entire diameter of the beam of light which passes through the system. Also, this unit is located the farthest from the object surface of the CRT tube (surface 19 in FIGS. 1-4).

Accordingly, it is important that this unit have aspherical lens elements which satisfy relatively tight manufacturing tolerances to achieve good aberration correction over the entire diameter of the light beam and that the overall optical power of the unit satisfies relatively tight tolerances and is relatively temperature insensitive so as to provide good focus control of the image projected onto the viewing screen. It is for these reasons that in accordance with the invention, the first lens unit includes a lens element having spherical surfaces and a relatively high optical power and other lens elements having at least one aspherical surface and a relatively low optical power.

Three interrelated factors come into play in the setting of these requirements: (1) a lens element having an aspherical surface is more difficult to fabricate than a lens element having only spherical surfaces, i.e., it is difficult to achieve the same tolerance levels with an aspheric lens element as achieved with a spherical lens element; (2) aspherical lens elements having large thickness variations are more difficult to fabricate than aspherical lens elements having a relatively constant thickness; and (3) lens elements having low optical power have smaller variations in thickness than lens elements having high optical power.

Thus, in accordance with the invention, the A unit is composed of three lens elements a lens element having spherical surfaces and a relatively high optical power and two lens elements each having at least one aspherical surface and a relatively low optical power. In this way, the power of the A unit is carried by the lens element which has spherical surfaces and thus is easiest to fabricate with tight tolerances, and the aspherical elements, because they have low power and thus a relatively constant thickness, are made easier to fabricate.

Quantitatively, the absolute value of the focal length in air of each of the lens elements having an aspherical surface is preferably at least about 1.3 times the absolute value of the focal length of the spherical lens element. More preferably, the ratio of the absolute values of the focal lengths is at least about 2:1, and most preferably, at least about 3:1. In terms of the overall focal length of the lens system, i.e., $f_0$, the ratio of the absolute value of the focal length in air of each of the aspherical lens elements of the A unit to $f_0$ is preferably at least about 3:1, more preferably at least about 5:1, and most preferably at least about 10:1.

The aspherical lens elements of the A unit are preferably composed of a plastic material such as an acrylic material and the spherical lens element is preferably composed of glass. Other materials can be used, as desired, e.g., the spherical element can be composed of plastic.

The material of the spherical element preferably has a relatively high index of refraction so that the optical power which is carried by this element is achieved with less curvature of the lens surfaces so that less aberrations are introduced into the lens system for correction by other components of the system. When the spherical element is composed of glass, a flint glass is preferably used since such a glass provides the desired higher index of refraction at a lower cost than if a crown glass is used.

When plastics are used to form the aspherical lens elements of the A unit, these elements should preferably have relatively uniform thicknesses in order to facilitate molding using injection molding techniques. Quantitatively, the ratio of the maximum thickness of the lens element in a direction parallel to the lens system's optical axis to the minimum thickness in that direction should preferably be less than about 2:1, more preferably, less than about 1.7:1, and most preferably, less than about 1.5:1.

As shown in FIGS. 1-4, the A lens unit has the spherical lens element at the image (long conjugate) end of the unit and the aspherical lens elements at the object (short conjugate) end of the unit. Other arrangements of these elements can be used as desired, e.g., the spherical lens element can be located between the aspherical lens elements or can be at the object (short conjugate) end of the unit.

In the case of front projection televisions, it is advantageous to use a glass lens element at the image end of the A unit since this end of the system is exposed during use and thus subject to damage. This element will generally have spherical surfaces since it is relatively difficult to fabricate an aspherical lens element out of glass.

It should be noted that the spherical lens element shown in FIGS. 1-4 is in the form of a positive meniscus lens. The spherical lens element of the A unit will normally take this form in the practice of the invention.

The B unit of the lens systems of the invention provide the majority of the lens system's positive optical power. This unit preferably includes a color-correcting doublet to correct longitudinal color aberration. The lens elements making up this unit (e.g., L4, L5, and L6 in FIGS. 1-4) preferably are composed of glass.

The CR and C units of the lens systems of the invention serve to correct off axis aperture dependent aberrations and field dependent aberrations. In particular, the CR unit is effective in dealing with oblique spherical aberrations, while the C unit is effective in reducing the system's field curvature.

The CR unit preferably comprises a single aspherical lens element composed of plastic (e.g., L7 in FIGS. 1-4), while the C unit is composed of an aspherical plastic lens element (e.g., L8 in FIGS. 114 4) and a fluid for coupling the lens system to the faceplate of the CRT (e.g., in FIGS. 1-4, the coupling fluid fills the space between surfaces S17 and S18). If desired, the aspherical plastic lens element of the C unit can include an absorptive color filter material in accordance with Wessling, U.S. Pat. No. 5,055,922.

In FIGS. 1-4, the faceplate of the CRT is flat (see surfaces S18 and S19) and thus does not contribute to the power of the C unit. When the faceplate is curved, in accordance with conventional practice, its power is included in calculating the overall properties of the lens system and, in particular, the properties of the C unit.

The surface quality constraints on the C and CR elements are not as strict as those on the aspherical lens elements of the A unit because the aspherical lens elements of the CR and C units lie closer to the object plane than those of the A unit and thus variations in the shapes of these lens elements resulting from manufacturing tolerances and/or temperature changes are not as critical. For reasons similar to those discussed above with regard to the aspherical lens elements of the A unit, the aspherical lens elements of the CR and C units are preferably of relatively low power. In terms of the overall lens system, it is thus preferred that all plastic elements used in the system have a focal length in air whose absolute magnitude is at least about 3 times $f_0$.

FIGS. 1 to 4 illustrate various lens systems constructed in accordance with the invention. Corresponding prescriptions appear in Tables 1 to 4, respectively. The glasses and plastics referred to in Tables 1-4 are set forth in Table 8, where the glass names are the SCHOTT designations. Equivalent glasses made by other manufacturers can be used in the practice of the invention. The aspheric coefficients set forth in the tables are for use in the following equation:

$$z = \frac{cy^2}{1 + [1 - (1 + k)c^2y^2]^{\frac{1}{2}}} + ADy^4 + AEy^6 + AFy^8 + AGy^{10} + AHy^{12} + AIy^{14}$$

where z is the surface sag at a distance y from the optical axis of the system, c is the curvature of the lens at the optical axis, and k is a conic constant which is zero for the lens systems of FIGS. 1-4.

The abbreviations used in these tables and in Tables 5-7 are as follows: SN—surface number; CLR. AP—clear aperture; EFL—effective focal length; ZP—zoom position; MAG—magnification; L—lens element number; U—lens unit number, and FINITE f/NO—working (as opposed to infinity) f—number. All dimensions given in the tables are in millimeters. Surfaces and lens elements are identified by "S" and "L" numbers, respectively, in FIGS. 1-4.

Surface 13 in the Tables 1-3 and surface 1 in Table 4 correspond to the location of a vignetting aperture (not shown in the figures). The material designations 439550 and 539590 set forth in Table 1-4 represent the index of refraction and dispersion characteristics of the coupling fluid between S17 and S18 and the CRT faceplate between S18 and S19, respectively. Specifically, a $N_e$ value for the material is obtained by adding 1,000 to the first three digits of the designation, and a $V_e$ value is obtained from the last three digits by placing a decimal point before the last digit.

The zoom spacings set forth in Table 1-4 are used to adjust the focus of the lens system to meet the requirements of specific applications. The major adjustments are made using spacing 15, with touch-up adjustments being made using spacing 4 for the system of FIGS. 1 and 2 and spacings 6 and 7 for FIGS. 3 and 4, respectively.

Summaries of the various properties of the lens systems of FIGS. 1-4 are set forth in Table 5-7. As shown in Table 5, each of the lens systems has $|f_{L2}|/f_{L1}$ and $|f_{L3}|/f_{L1}$ values which are greater than 1.4. Similarly, each of the lens systems has $|f_{L2}|/f_0$ and $|f_{L3}|/f_0$ values which are greater than 3.5. As shown in Table 6, the $T_{max}/T_{min}$ values for lens elements L2 and L3 are each below 1.4 for all of the examples.

Figure 2:
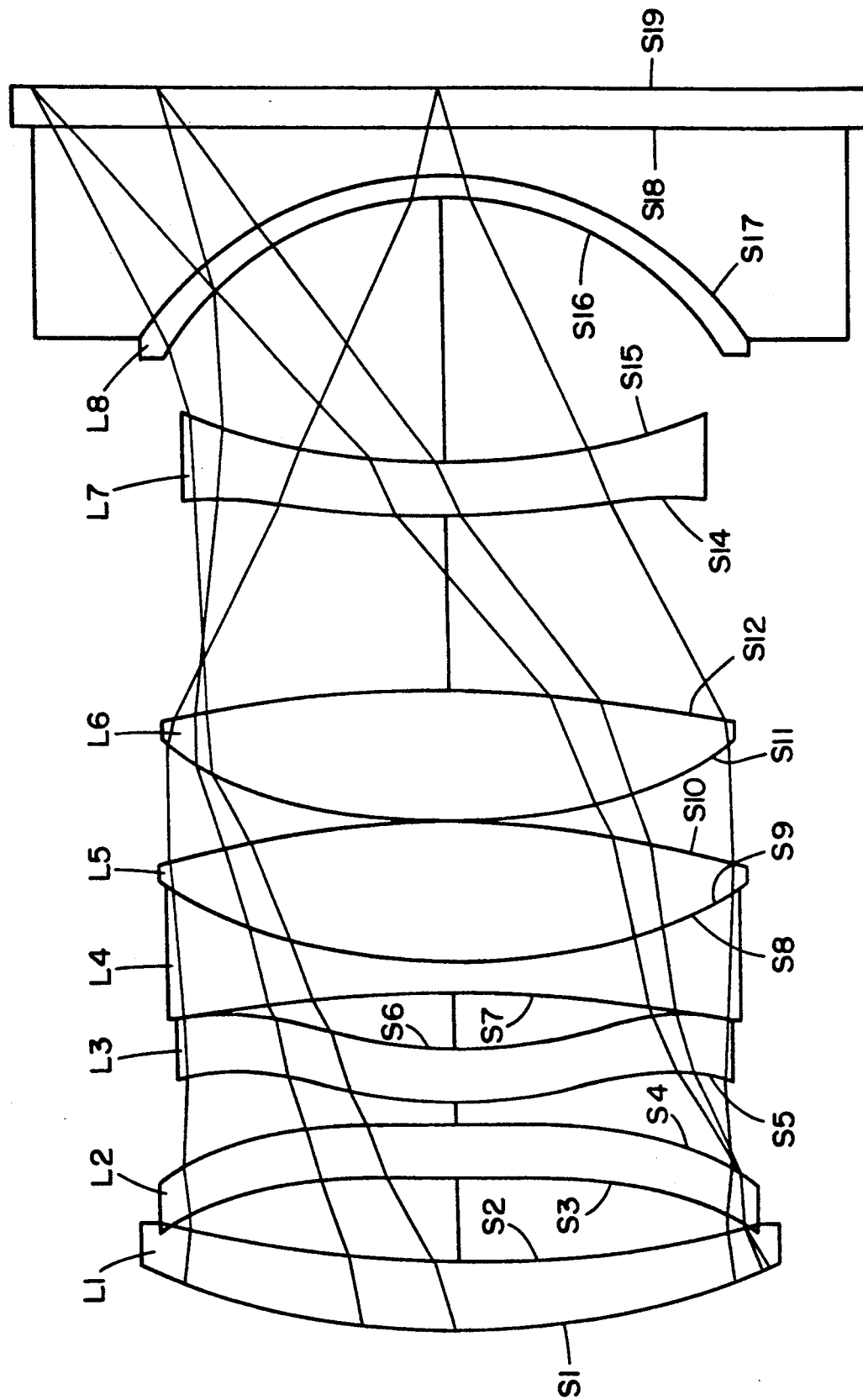
Figure 3:
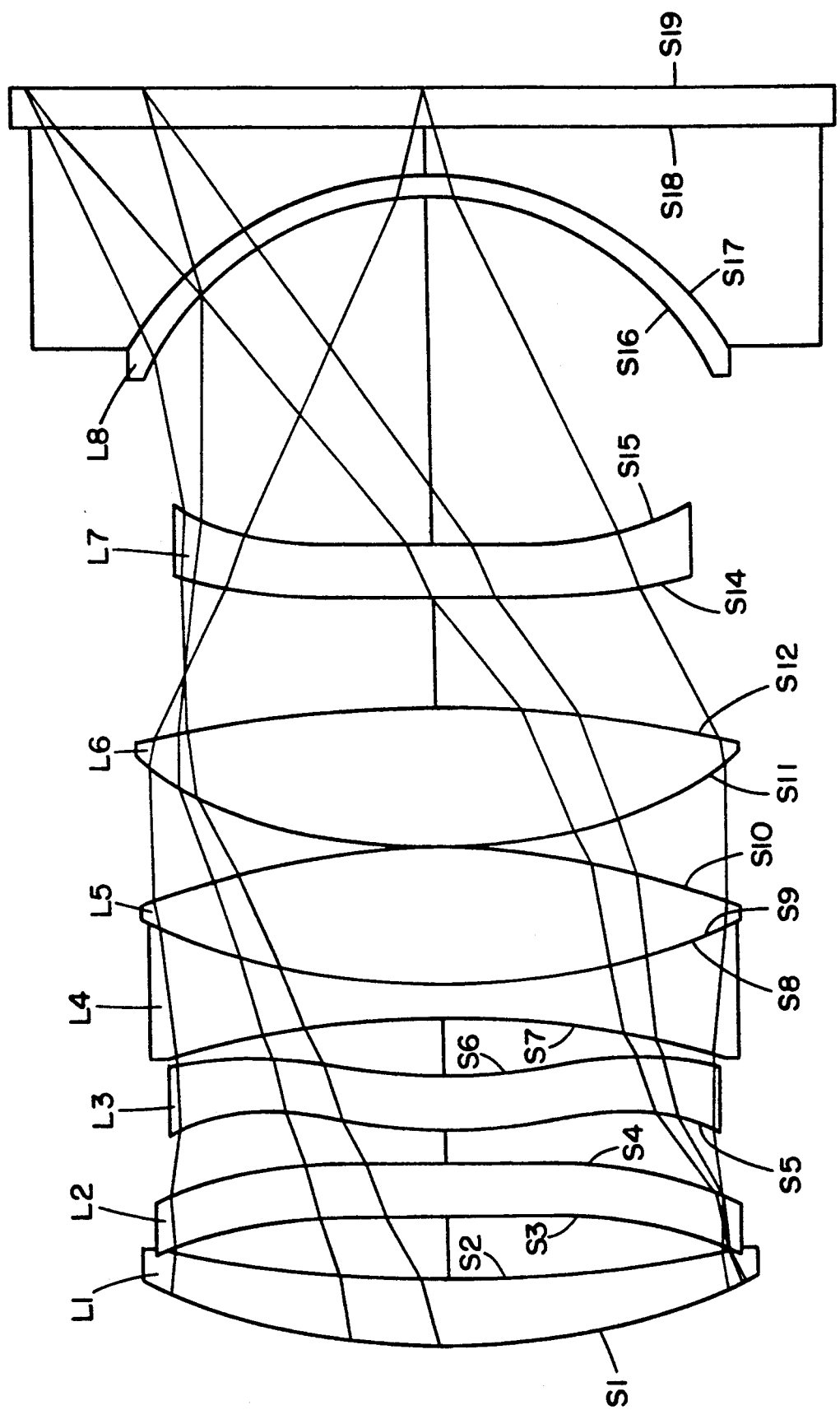
Figure 4:
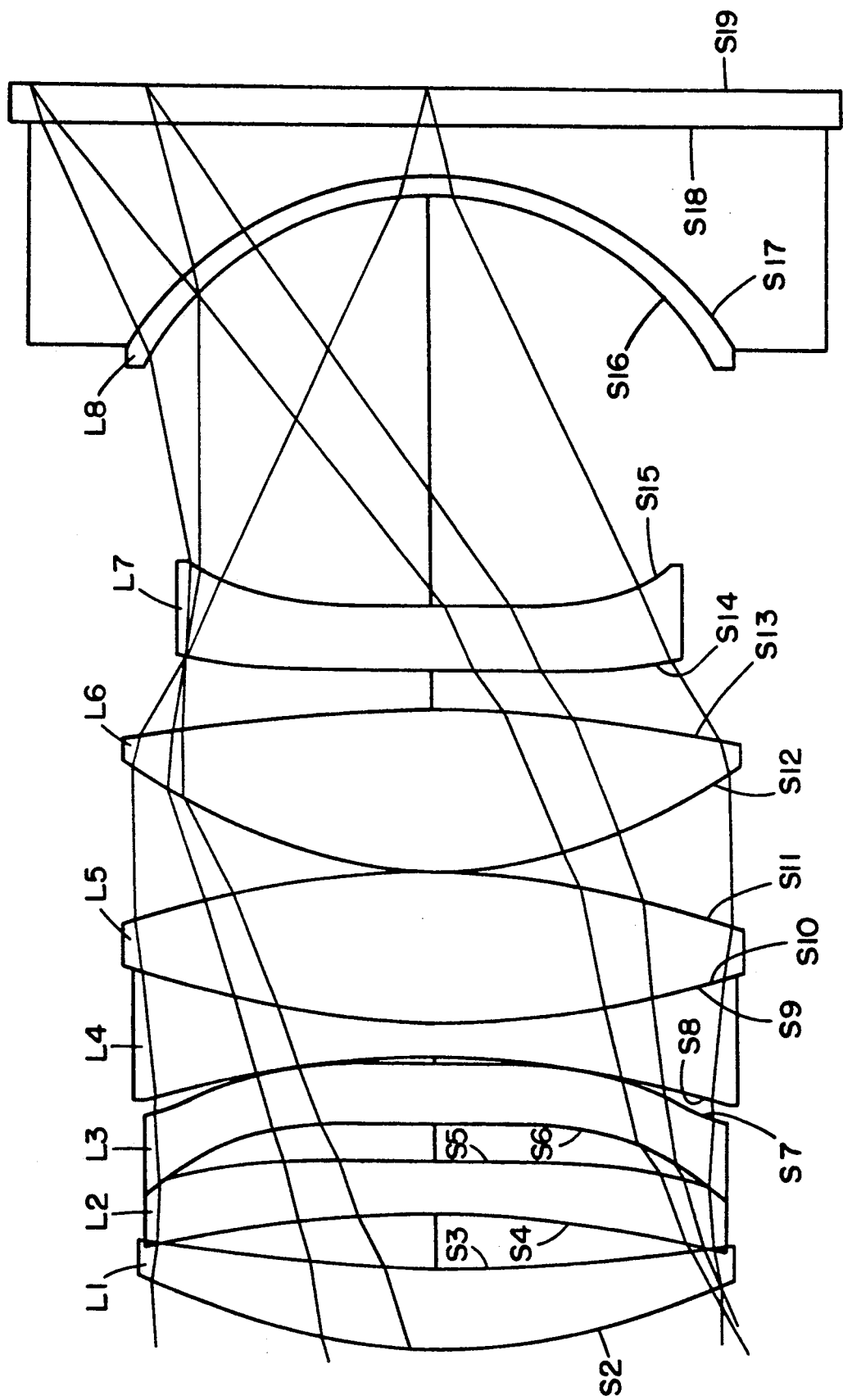
Figure 5:
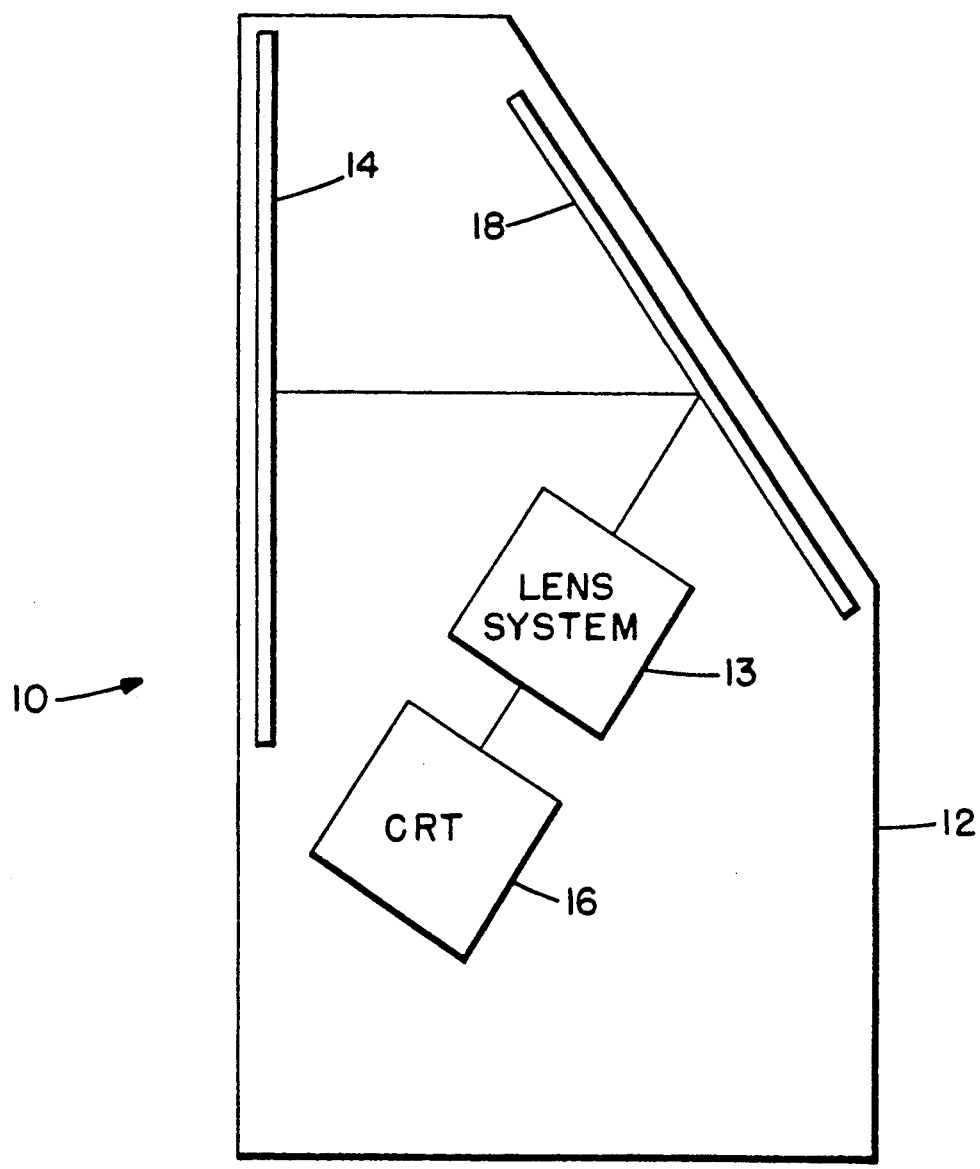
FIG. 5 is a schematic diagram of a rear projection TV employing a lens system constructed in accordance with the invention.

FIG. 5 is a schematic diagram of a rear projection television 10 constructed in accordance with the invention. As shown in this figure, projection television 10 includes cabinet 12 having projection screen 14 along its front face and slanted mirror 18 along its back face. Module 13 in FIG. 5 schematically illustrates a lens system constructed in accordance with the invention and module 16 illustrates its associated CRT tube. In practice, three lens systems 13 and three CRT tubes 16 are used to project red, green, and blue images onto screen 14. Front projection television sets do not include a mirror 18 or a screen 14 as part of cabinet 12, but otherwise operate in the same basic manner as a rear projection television set. In terms of the lens systems of FIGS. 1 4, those of FIGS. 2-4 are suitable for rear projection applications, while that of FIG. 1 is suitable for front projection applications.

Although specific embodiments of the invention have been described and illustrated, it is to be understood that a variety of modifications which do not depart from the scope and spirit of the invention will be evident to persons of ordinary skill in the art from the foregoing disclosure. The following claims are intended to cover the specific embodiments set forth herein as well as such modifications, variations, and equivalents.

TABLE 1

| LENS SYSTEM PRESCRIPTION | | | | | |
|---|---|---|---|---|---|
| SN | RADIUS | THICKNESS | MATERIAL | CLR. AP. | LENS NO. |
| 1 | 144.6311 | 12.00000 | F2 | 109.17 | L1 |

TABLE 1-continued

| | | | | | |
|---|---|---|---|---|---|
| 2 | 215.9846 | 14.48000 | | 101.83 | |
| 3 | −19606.4994 | 8.95000 | ACRYLIC | 101.72 | L2 |
| 4 | −4146.6201 | 3.98580 | | 100.69 | |
| 5 | 83.9872 | 9.50000 | ACRYLIC | 95.59 | L3 |
| 6 | 81.7690 | 9.54000 | | 96.56 | |
| 7 | −278.1134 | 5.81000 | FD10 | 96.56 | L4 |
| 8 | 107.8228 | 0.04000 | | 99.49 | |
| 9 | 108.1114 | 24.02000 | BACD18 | 99.50 | L5 |
| 10 | −175.6724 | 0.20000 | | 100.43 | |
| 11 | 99.2294 | 22.43000 | BACD5 | 99.49 | L6 |
| 12 | −262.3674 | 5.70000 | | 97.50 | |
| 13 | ∞ | 25.01060 | | 87.71 | |
| 14 | 200.0083 | 9.00000 | ACRYLIC | 90.50 | L7 |
| 15 | 166.2227 | 41.62365 | | 92.33 | |
| 16 | −56.8907 | 4.00000 | ACRYLIC | 97.31 | L8 |
| 17 | −65.0000 | 8.70000 | 439550 | 102.39 | |
| 18 | ∞ | 6.50000 | 539590 | 138.90 | |
| 19 | ∞ | −0.01164 | | 145.38 | |

ASPHERICAL SURFACE DATA

| SN | AD | AE | AF | AG | AH | AI |
|---|---|---|---|---|---|---|
| 3 | −9.5782E-07 | −2.6543E-10 | 1.1440E-13 | −2.5396E-17 | 4.1825E-21 | −8.7871E-25 |
| 4 | −1.4291E-06 | 1.7731E-11 | 1.2522E-14 | 4.6265E-18 | −3.7253E-21 | 2.9931E-25 |
| 5 | −1.8281E-06 | −1.6585E-10 | −1.7380E-14 | −1.3368E-17 | 9.8454E-21 | −9.5039E-25 |
| 6 | −1.3793E-06 | −4.3154E-10 | 9.9776E-14 | −3.0724E-17 | 1.5142E-20 | −2.3041E-24 |
| 14 | 5.2256E-07 | −4.6735E-10 | −2.3299E-14 | 3.0608E-17 | 1.9759E-21 | −4.1345E-24 |
| 15 | 1.1857E-06 | −5.3358E-10 | 1.4850E-13 | −7.6509E-17 | 4.1679E-20 | −8.7734E-24 |
| 16 | −1.5543E-06 | 2.4641E-09 | −1.4266E-12 | 3.3578E-16 | 6.7132E-21 | −8.1106E-24 |

ZOOM SPACINGS

| ZP SN | 4 | 15 | EFL | MAG | FINITE f/NO |
|---|---|---|---|---|---|
| 1 | 3.445 | 44.246 | 117.770 | −0.056 | 1.29 |
| 2 | 3.696 | 42.918 | 119.109 | −0.042 | 1.27 |
| 3 | 3.986 | 41.624 | 120.449 | −0.028 | 1.25 |

TABLE 2

LENS SYSTEM PRESCRIPTION

| SN | RADIUS | THICKNESS | MATERIAL | CLR. AP. | LENS NO. |
|---|---|---|---|---|---|
| 1 | 144.6311 | 12.00000 | F2 | 109.41 | L1 |
| 2 | 215.9846 | 14.48000 | | 102.28 | |
| 3 | −7999.9995 | 8.95000 | ACRYLIC | 102.16 | L2 |
| 4 | −10000.0000 | 4.35035 | | 100.60 | |
| 5 | 81.6517 | 9.50000 | ACRYLIC | 95.33 | L3 |
| 6 | 84.3595 | 9.54000 | | 96.54 | |
| 7 | −278.1134 | 5.81000 | FD10 | 96.54 | L4 |
| 8 | 107.8228 | 0.04000 | | 99.58 | |
| 9 | 108.1114 | 24.02000 | BACD18 | 99.58 | L5 |
| 10 | −175.6724 | 0.20000 | | 100.53 | |
| 11 | 99.2294 | 22.43000 | BACD5 | 99.94 | L6 |
| 12 | −262.3674 | 5.70000 | | 98.07 | |
| 13 | ∞ | 24.92000 | | 87.94 | |
| 14 | 230.5045 | 9.00000 | ACRYLIC | 89.38 | L7 |
| 15 | 176.1671 | 43.62426 | | 91.23 | |
| 16 | −56.8907 | 4.00000 | ACRYLIC | 98.12 | L8 |
| 17 | −65.0000 | 8.70000 | 439550 | 103.14 | |
| 18 | ∞ | 6.50000 | 539590 | 141.00 | |
| 19 | ∞ | 0.01358 | | 148.00 | |

ASPHERICAL SURFACE DATA

| SN | AD | AE | AF | AG | AH | AI |
|---|---|---|---|---|---|---|
| 3 | −9.8860E-07 | −2.6896E-10 | 1.2498E-13 | −2.5084E-17 | 3.6623E-21 | −5.9268E-25 |
| 4 | −1.4553E-06 | 2.8456E-11 | 2.1158E-14 | 6.3499E-18 | −4.6971E-21 | 4.9069E-25 |
| 5 | −1.6432E-06 | −1.7470E-10 | −2.1052E-14 | −1.8528E-17 | 1.1070E-20 | −1.3667E-24 |
| 6 | −1.1457E-06 | −4.4805E-10 | 8.7303E-14 | −3.1968E-17 | 1.4592E-20 | −2.0953E-24 |
| 14 | 5.9142E-07 | −5.9613E-10 | 1.8671E-14 | 5.3147E-17 | −1.9296E-20 | 6.8920E-25 |
| 15 | 1.2573E-06 | −6.2446E-10 | 2.0316E-13 | −9.9458E-27 | 4.9342E-20 | −9.8733E-24 |
| 16 | −1.5543E-06 | 2.4641E-09 | −1.4266E-12 | 3.3578E-16 | 6.7132E-21 | −8.1106E-24 |

ZOOM SPACINGS

| ZP SN | 4 | 15 | EFL | MAG | FINITE f/NO |
|---|---|---|---|---|---|
| 1 | 3.4631 | 46.8950 | 112.810 | −0.1034 | 1.33 |
| 2 | 3.8947 | 45.5305 | 114.106 | −0.0884 | 1.31 |
| 3 | 4.3503 | 43.6243 | 115.943 | −0.0675 | 1.29 |

TABLE 3

LENS SYSTEM PRESCRIPTION

TABLE 3-continued

| SN | RADIUS | THICKNESS | MATERIAL | CLR. AP. | LENS NO. |
|---|---|---|---|---|---|
| 1 | 135.4754 | 12.00000 | F2 | 107.80 | L1 |
| 2 | 277.4563 | 11.25064 | | 102.67 | |
| 3 | −362.2540 | 8.95000 | ACRYLIC | 102.38 | L2 |
| 4 | −10000.0003 | 6.23262 | | 101.23 | |
| 5 | 95.1559 | 9.50000 | ACRYLIC | 97.15 | L3 |
| 6 | 114.6883 | 9.81994 | | 98.19 | |
| 7 | −183.5783 | 5.81000 | FD4 | 98.16 | L4 |
| 8 | 133.0004 | 0.05810 | | 103.32 | |
| 9 | 133.6571 | 24.50000 | BACD18 | 103.33 | L5 |
| 10 | −144.8999 | 0.29051 | | 104.68 | |
| 11 | 101.0721 | 24.54000 | BACD5 | 105.32 | L6 |
| 12 | −252.3185 | 7.57990 | | 103.47 | |
| 13 | ∞ | 11.96000 | | 91.54 | |
| 14 | 8217.9383 | 9.00000 | ACRYLIC | 91.68 | L7 |
| 15 | 1619.3450 | 60.82799 | | 90.11 | |
| 16 | −56.2553 | 4.00000 | ACRYLIC | 100.07 | L8 |
| 17 | −64.0000 | 8.70000 | 439550 | 105.10 | |
| 18 | ∞ | 6.50000 | 539590 | 140.00 | |
| 19 | ∞ | −0.00836 | | 146.00 | |

ASPHERICAL SURFACE DATA

| SN | AD | AE | AF | AG | AH | AI |
|---|---|---|---|---|---|---|
| 3 | −6.9823E-08 | −1.5779E-10 | 3.5786E-14 | −6.6428E-18 | −3.8768E-22 | 4.4036E-26 |
| 4 | −9.0655E-07 | 1.2787E-10 | −5.6625E-14 | −3.3908E-18 | 4.9946E-21 | −7.4294E-25 |
| 5 | −2.2100E-06 | −2.7678E-10 | 2.5345E-14 | −6.7425E-18 | 2.1250E-20 | −4.29E5E-24 |
| 6 | −1.2342E-06 | −5.8818E-10 | 2.0832E-13 | −1.4382E-17 | 4.5399E-21 | −1.2189E-24 |
| 14 | 9.2565E-07 | −1.9511E-10 | 8.0925E-14 | −1.9906E-17 | −1.0724E-21 | 7.4724E-25 |
| 15 | 1.2475E-06 | 3.6575E-12 | −6.6269E-14 | 8.2090E-17 | −3.3044E-20 | 5.7284E-24 |
| 16 | −1.1479E-06 | 1.2418E-09 | −7.3658E-13 | 3.5451E-16 | −1.0642E-19 | 1.6094E-23 |

ZOOM SPACINGS

| ZP | SN | 6 | 15 | EFL | MAG | FINITE f/NO |
|---|---|---|---|---|---|---|
| 1 | | 10.010 | 62.943 | 115.340 | −0.1040 | 1.31 |
| 2 | | 9.912 | 61.549 | 116.624 | −0.0889 | 1.29 |
| 3 | | 9.820 | 60.828 | 117.292 | −0.0810 | 1.28 |

TABLE 4

LENS SYSTEM PRESCRIPTION

| SN | RADIUS | THICKNESS | MATERIAL | CLR. AP. | LENS NO. |
|---|---|---|---|---|---|
| 1 | ∞ | 1.00000 | | 110.26 | |
| 2 | 120.8350 | 13.68000 | FD2 | 102.24 | L1 |
| 3 | 326.1831 | 9.97889 | | 100.24 | |
| 4 | −179.0119 | 8.95000 | ACRYLIC | 100.20 | L2 |
| 5 | −1531.4489 | 5.98212 | | 99.49 | |
| 6 | 403.3625 | 10.89000 | ACRYLIC | 99.33 | L3 |
| 7 | −536.1054 | 0.99976 | | 100.48 | |
| 8 | −170.4515 | 5.81000 | FD11 | 100.06 | L4 |
| 9 | 161.1661 | 0.05810 | | 104.31 | |
| 10 | 162.1419 | 27.19775 | BACD18 | 104.32 | L5 |
| 11 | −156.1028 | 0.29051 | | 106.88 | |
| 12 | 91.6812 | 27.58000 | BACD5 | 106.90 | L6 |
| 13 | −276.5980 | 7.26911 | | 104.16 | |
| 14 | −576.2726 | 10.89000 | ACRYLIC | 88.44 | L7 |
| 15 | 1976.2529 | 69.89029 | | 85.50 | |
| 16 | −55.5302 | 4.00000 | ACRYLIC | 99.84 | L8 |
| 17 | −64.0000 | 8.70000 | 439550 | 104.50 | |
| 18 | ∞ | 6.50000 | 539590 | 139.00 | |
| 19 | ∞ | 0.00501 | | 145.00 | |

ASPHERICAL SURFACE DATA

| SN | AD | AE | AF | AG | AH | AI |
|---|---|---|---|---|---|---|
| 4 | 2.1220E-07 | −4.3823E-11 | 2.2121E-14 | −2.0615E-18 | 4.2281E-22 | −4.0955E-25 |
| 5 | −6.1810E-07 | 6.9851E-11 | −2.8868E-14 | 1.8352E-19 | 1.8032E-21 | −1.8080E-24 |
| 6 | −2.1970E-06 | −3.6701E-10 | 2.0169E-14 | 2.6033E-17 | 2.7029E-20 | −7.9247E-24 |
| 7 | −1.2539E-06 | −4.9393E-10 | 2.3141E-13 | −2.6285E-17 | 1.2458E-20 | −1.8207E-24 |
| 14 | 1.0202E-06 | −5.9695E-11 | 3.8512E-14 | −2.0203E-17 | 2.4522E-21 | −1.6502E-25 |
| 15 | 1.5664E-06 | 1.2304E-10 | −6.8053E-14 | 6.2021E-17 | −1.5021E-20 | 1.4658E-24 |
| 16 | −6.7977E-07 | 8.2191E-10 | −4.8179E-13 | 2.9742E-16 | −1.0788E-19 | 1.8002E-23 |

ZOOM SPACINGS

| ZP | SN | 7 | 15 | EFL | MAG | FINITE f/NO |
|---|---|---|---|---|---|---|
| 1 | | 1.233 | 71.992 | 115.084 | −0.1040 | 1.31 |
| 2 | | 1.040 | 70.624 | 116.343 | −0.0889 | 1.29 |
| 3 | | 1.000 | 69.890 | 117.042 | −0.0810 | 1.28 |

TABLE 5

| | Ratios of Absolute Values of Focal Lengths* | | | | | | | |
|---|---|---|---|---|---|---|---|---|
| | $|f_{L1}|/f_0$ | $|f_{L2}|/f_0$ | $|f_{L3}|/f_0$ | $|f_{L7}|/f_0$ | $|f_{L8}|/f_0$ | $|f_{L2}|/f_{L1}$ | $|f_{L3}|/f_{L1}$ | $f_0$ (mm) |
| Ex. 1 | 5.53 | 89.44 | 126.83 | 18.36 | 9.27 | 16.17 | 22.93 | 119.11 |
| Ex. 2 | 5.77 | 711.30 | 20.92 | 14.04 | 9.67 | 123.20 | 3.62 | 114.11 |
| Ex. 3 | 3.52 | 6.53 | 8.36 | 35.05 | 9.74 | 1.85 | 2.37 | 116.62 |
| Ex. 4 | 2.46 | 3.54 | 4.02 | 7.76 | 8.66 | 1.44 | 1.63 | 116.34 |

*All focal lengths are measured in air.

TABLE 6

| | $T_{max}/T_{min}$ | |
|---|---|---|
| | L2 | L3 |
| Example 1 | 1.1 | 1.2 |
| Example 2 | 1.1 | 1.1 |
| Example 3 | 1.1 | 1.3 |
| Example 4 | 1.2 | 1.3 |

TABLE 7

| | Unit Powers* | | | | |
|---|---|---|---|---|---|
| | $f_{U1}/f_0$ | $f_{U2}/f_0$ | $f_{CR}/f_0$ | $f_{U3}/f_0$ | $f_0$ (mm) |
| Example 1 | 4.86 | 0.95 | −18.36 | −1.07 | 119.11 |
| Example 2 | 4.49 | 0.99 | −14.04 | −1.12 | 114.11 |
| Example 3 | 3.93 | 1.01 | −35.05 | −1.09 | 116.62 |
| Example 4 | 2.71 | 1.04 | −7.76 | −1.07 | 116.34 |

*U1 = L1 + L2 + L3
U2 = L4 + L5 + L6
CR = L7
U3 = L8 + coupling fluid between S17 and S18

TABLE 8

| | MATERIAL | $N_e$ | $V_e$ |
|---|---|---|---|
| 1 | F2 | 1.62409 | 36.1 |
| 2 | ACRYLIC | 1.49354 | 57.3 |
| 3 | FD10 | 1.73432 | 28.1 |
| 4 | BACD18 | 1.64129 | 55.2 |
| 5 | BACD5 | 1.59142 | 61.0 |
| 6 | FD2 | 1.65223 | 33.6 |
| 7 | FD11 | 1.79193 | 25.5 |
| 8 | FD4 | 1.76168 | 27.3 |

What is claimed is:

1. A projection lens system for use with a cathode ray tube comprising in order from the system's image side:
 a first lens unit comprising a first lens element having spherical surfaces, a second lens element having at least one aspherical surface, and a third lens element having at least one aspherical surface, the second and third lens elements each having a focal length whose magnitude is greater than the focal length of the first lens element;
 a second lens unit for supplying the majority of the lens system's positive optical power;
 a corrector lens unit having at least one aspherical surface; and
 a third lens unit which is associated with the cathode ray tube during use of the lens system and which provides most of the correction for the field curvature of the lens system, said third lens unit having a negative optical power.

2. The projection lens system of claim 1 wherein the first lens element has a focal length whose absolute value is $f_1$, the second lens element has a focal length whose absolute value is $f_2$, and the third lens element has a focal length whose absolute value is $f_3$, and each of $f_2/f_1$ and $f_3/f_1$ is greater than about 1.3.

3. The projection lens system of claim wherein the lens system has a focal length whose absolute value is $f_0$, the second lens element has a focal length whose absolute value is $f_2$, and the third lens element has a focal length whose absolute value is $f_3$, and each of $f_2/f_0$ and $f_3/f_0$ is greater than about 3.0.

4. The projection lens system of claim wherein the second and third lens elements are made of plastic.

5. The projection lens system of claim 4 wherein the lens system has an optical axis and the second lens element has a maximum and a minimum thickness in a direction parallel to the optical axis and the third lens element has a maximum and a minimum thickness in a direction parallel to the optical axis and wherein the ratio of the maximum thickness to the minimum thickness for each of the second and third lens elements is less than about 2.0.

6. The projection lens system of claim 1 wherein the first lens element is composed of glass.

7. The projection lens system of claim 6 wherein the first lens element is composed of a flint glass.

8. The projection lens system of claim 1 wherein the first lens element is a positive meniscus lens.

9. The projection lens system of claim wherein the second lens unit includes a color correcting doublet.

10. A projection lens system for use with a cathode ray tube comprising in order from the system's image side:
 a first lens unit for primarily correcting aperture dependent aberrations, said unit comprising a first lens element, a second lens element, and a third lens element, the first lens element being composed of glass and the second and third lens elements being composed of plastic;
 a second lens unit for supplying the majority of the lens system's positive optical power;
 a corrector lens unit comprising at least one plastic lens element; and
 a third lens unit which is associated with the cathode ray tube during use of the lens system and which provides most of the correction for the field curvature of the lens system, said third lens unit having a negative optical power.

11. The projection lens system of claim 10 wherein the lens system has an optical axis and the second lens element has a maximum and a minimum thickness in a direction parallel to the optical axis and the third lens element has a maximum and a minimum thickness in a direction parallel to the optical axis and wherein the ratio of the maximum thickness to the minimum thickness for each of the second and third lens elements is less than about 2.0.

12. The projection lens system of claim 10 wherein the first lens element is composed of a flint glass.

13. The projection lens system of claim 10 wherein the second lens unit includes a color correcting doublet.

14. A projection television set comprising a cathode ray tube, a screen, and a projection lens system for projecting light from the cathode ray tube onto the screen to form an image, said projection lens system having a long conjugate in the direction of the screen and a short conjugate in the direction of the cathode ray tube, said projection lens system comprising from the long conjugate:

a first lens unit comprising a first lens element having spherical surfaces, a second lens element having at least one aspherical surface, and a third lens element having at least one aspherical surface, the second and third lens elements each having a focal length whose magnitude is greater than the focal length of the first lens element;

a second lens unit for supplying the majority of the projection lens system's positive optical power;

a corrector lens unit having at least one aspherical surface; and a third lens unit which is associated with the cathode ray tube and provides most of the correction for the field curvature of the projection lens system, said third lens unit having a negative optical power.

15. The projection television set of claim 14 wherein the first lens element has a focal length whose absolute value is $f_1$, the second lens element has a focal length whose absolute value is $f_2$, and the third lens element has a focal length whose absolute value is $f_3$, and each of $f_2/f_1$ and $f_3/f_1$ is greater than about 1.3.

16. The projection television set of claim 14 wherein the projection lens system has a focal length whose absolute value is $f_0$, the second lens element has a focal length whose absolute value is $f_2$, and the third lens element has a focal length whose absolute value is $f_3$, and each of $f_2/f_0$ and $f_3/f_0$ is greater than about 3.0.

17. The projection television set of claim 14 wherein the second and third lens elements are made of plastic.

18. The projection television set of claim 17 wherein the projection lens system has an optical axis and the second lens element has a maximum and a minimum thickness in a direction parallel to the optical axis and the third lens element has a maximum and a minimum thickness in a direction parallel to the optical axis and wherein the ratio of the maximum thickness to the minimum thickness for each of the second and third lens elements is less than about 2.0.

19. The projection television set of claim 14 wherein the first lens element is composed of glass.

20. The projection television set of claim 19 wherein the first lens element is composed of a flint glass.

21. The projection television set of claim 14 wherein the first lens element is a positive meniscus lens.

22. The projection television set of claim 14 wherein the second lens unit includes a color correcting doublet.

23. The projection television set of claim 14 comprising two additional cathode ray tubes and two additional projection lens systems, one associated with each of the additional cathode ray tubes, each additional projection lens system having the same components and structure as the projection lens system of claim 14.

24. A projection television set comprising a cathode ray tube, a screen, and a projection lens system for projecting light from the cathode ray tube onto the screen to form an image, said projection lens system having a long conjugate in the direction of the screen, and a short conjugate in the direction of the cathode ray tube, said projection lens system comprising from the long conjugate:

a first lens unit for primarily correcting aperture dependent aberrations, said unit comprising a first lens element, a second lens element, and a third lens element, the first lens element being composed of glass and the second and third lens elements being composed of plastic;

a second lens unit for supplying the majority of the projection lens system's positive optical power;

a corrector lens unit comprising at least one plastic lens element; and a third lens unit which is associated with the cathode ray tube and provides most of the correction for the field curvature of the projection lens system, said third lens unit having a negative optical power.

25. The projection television set of claim 24 wherein the projection lens system has an optical axis and the second lens element has a maximum and a minimum thickness in a direction parallel to the optical axis and the third lens element has a maximum and a minimum thickness in a direction parallel to the optical axis and wherein the ratio of the maximum thickness to the minimum thickness for each of the second and third lens elements is less than about 2.0.

26. The projection television set of claim 24 wherein the first lens element is composed of a flint glass.

27. The projection television set of claim 24 wherein the second lens unit includes a color correcting doublet.

28. The projection television set of claim 24 comprising two additional cathode ray tubes and two additional projection lens systems, one associated with each of the additional cathode ray tubes, each additional projection lens system having the same components and structure as the projection lens system of claim 24.

* * * * *

UNITED STATES PATENT AND TRADEMARK OFFICE
CERTIFICATE OF CORRECTION

PATENT NO. : 5,309,283
DATED : May 3, 1994
INVENTOR(S) : Melvyn H. Kreitzer

Page 1 of 2

It is certified that error appears in the above-identified patent and that said Letters Patent is hereby corrected as shown below:

| Col. | Line | |
|---|---|---|
| 3 | 8 | Insert --system's image side:-- after "the" |
| 4 | 8 | Insert --:-- after "elements" |
| 5 | 20 | "114 4" should be --1-4-- |
| 6 | 19 | "1,000" should be --1.000-- |
| 7 | Table 2 | Second section, line SN15 under AG, "-9.9458E-27" should be -- -9.9458E-17-- |

UNITED STATES PATENT AND TRADEMARK OFFICE
CERTIFICATE OF CORRECTION

PATENT NO. : 5,309,283
DATED : May 3, 1994
INVENTOR(S) : Melvyn H. Kreitzer

Page 2 of 2

It is certified that error appears in the above-identified patent and that said Letters Patent is hereby corrected as shown below:

| | | |
|---|---|---|
| 10 | Table 3 | Second section, line SN5 under Al, "-4.29E5E-24" should be -- -4.2935E-24-- |
| 11 | 66 | Insert --1-- after "claim" |
| 12 | 14 | Insert --1-- after "claim" |
| 12 | 31 | Insert --1-- after "claim" |

Signed and Sealed this

Twenty-fifth Day of April, 2000

Attest:

Q. TODD DICKINSON

Attesting Officer

Director of Patents and Trademarks